April 7, 1970   R. W. FARMER   3,504,952
ROLLER BLOCK ASSEMBLY WITH OVERALL HEIGHT ADJUSTMENT
Filed May 1, 1968
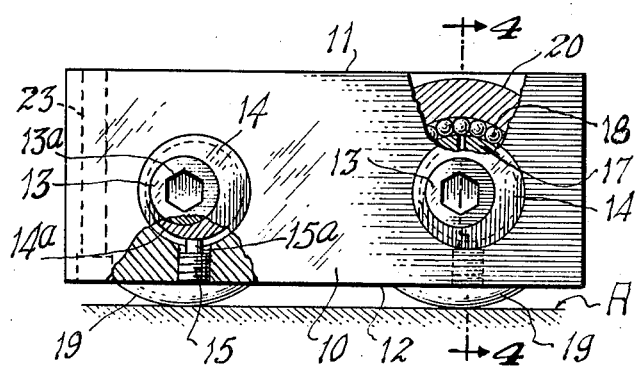
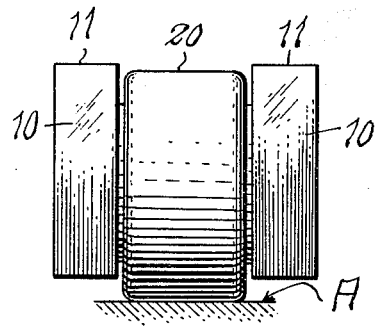
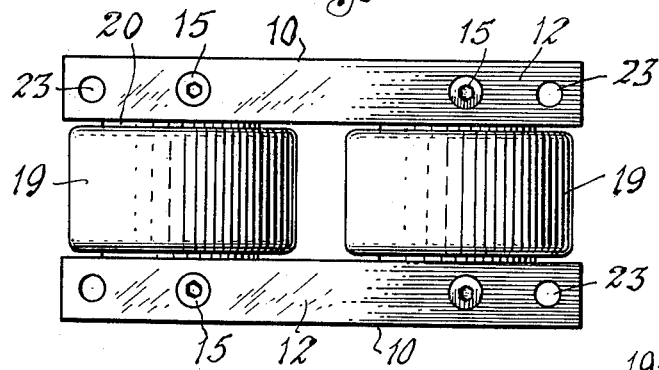
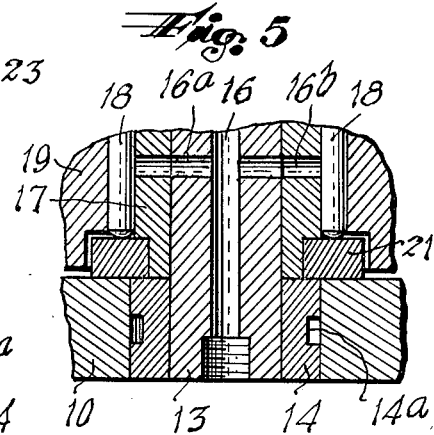
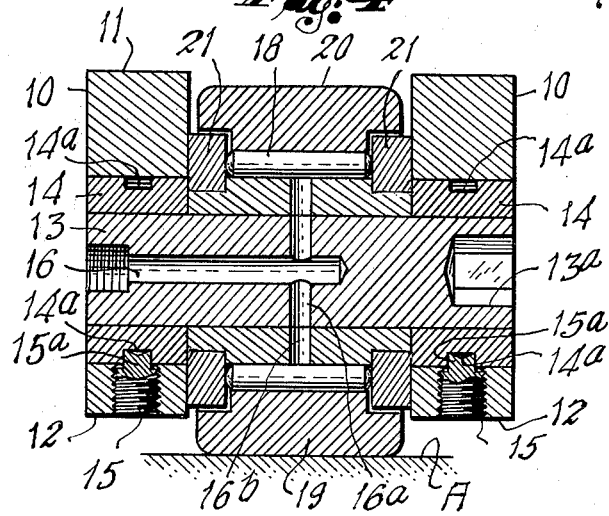
INVENTOR.
Robert W. Farmer
BY Harry B. Cook,
ATTORNEY ововано
United States Patent Office 3,504,952
Patented Apr. 7, 1970

3,504,952
ROLLER BLOCK ASSEMBLY WITH OVERALL HEIGHT ADJUSTMENT
Robert W. Farmer, Livingston, N.J., assignor, by mesne assignments, to Raritan Bearing Corporation, a corporation of Delaware
Filed May 1, 1968, Ser. No. 725,867
Int. Cl. F16c *19/00, 23/00*
U.S. Cl. 308—6                                               1 Claim

ABSTRACT OF THE DISCLOSURE

A roller assembly includes two side wall blocks each of which has opposite planar edges, and at least two rollers are journalled on parallel shafts each end of each of which has rigidly attached thereto an eccentric bushing that is mounted in the corresponding wall block for rotation to adjust the blocks relative to the rollers and is clamped in adjusted position by a set screw threaded in the wall block and having a reduced end portion disposed in a circumferential groove in the eccentric bushing.

BACKGROUND OF THE INVENTION

The present invention relates to roller bearing assemblies employed as linear motion way bearings in machines and installations requiring linear movement relative to mounting surfaces, for example a rail, track or machine way; and particularly the invention is directed to roller assemblies of the type comprising side wall blocks in and between which rollers are mounted.

In prior art bearing assemblies, difficulty has been encountered in attaining uniform contact between track and multiple rollers which the assembly must have in order to distribute the load equally and prevent excessive wear. Also known bearing assemblies do not provide for overall height adjustment to accommodate the assemblies, for example to different distances between rails, tracks or ways along which the assembly is movable.

SUMMARY

The present invention provides a roller block assembly unit comprising two side wall blocks each of which has opposite planar edges, and at least two rollers each mounted on a shaft between said wall blocks with one of said planar edges disposed outwardly of the roller peripheries and with portions of the rollers peripheries projecting beyond the other planar surfaces; and each shaft has thereon at each end means for adjusting the axes of the shafts relative to said planar edges, for example an eccentric bushing fixed on the shaft and mounted for rotation in the corresponding wall block, so that by rotating the bushings infinite variations may be obtained in the positioning of the assembly with respect to the mounting surfaces such as rails, tracks or machine ways.

The invention also contemplates means such as set screws threaded in the wall blocks, for clamping the bushings in adjusted positions.

The invention also provides a novel construction and combination of the bushing, wall block and set screw such that the set screw also holds the wall blocks in properly assembled relationship to the bushings and the rollers.

Brief description of the drawings

FIGURE 1 is a side elevation, partly in section of a roller block assembly embodying the invention.
FIGURE 2 is an end elevation of the assembly shown in FIGURE 1.
FIGURE 3 is a bottom plan view of the assembly.
FIGURE 4 is a sectional view approximately on the plane of the line 4—4 of FIGURE 1.
FIGURE 5 is a fragmentary sectional view illustrating a detail of the assembly.

Detailed description

The foregoing drawings illustrate a preferred embodiment of my invention. As shown, the roller block assembly structure comprises a pair of oblong side walls 10 of rectangular cross section each having, with reference to FIGS. 1–3, a planar top edge face 11 and a planar bottom edge face 12 which lie, respectively, in a horizontal plane common to each top edge pair and in a horizontal plane common to each bottom edge pair. The side walls are fixedly connected in laterally spaced parallel relation by means of a pair of transversely extending shafts 13 having rigidly secured thereto at their ends eccentric bushings 14 rotatably mounted in complemental socket bores in the side walls, with the axes of the shafts lying in a plane intermediate and parallel to the planes of the top and bottom edge faces of the side walls. On each shaft is an inner raceway 17 for antifriction rollers 18 interposed between the inner raceway and a freely rotatable outer raceway 19 having a cylindrical outer surface 20 of appreciable extent but less than the distance between the opposed inner faces of the wall blocks, for clearance, the peripheral surface of the rollers being disposed inwardly of the plane of the upper planar surfaces 11 and other portions of the peripheral surfaces of the rollers being disposed outwardly of the other or lower planer surfaces.

Cooperating with the bushings are set screws 15 threaded in the walls 10 each with one end extending through one planar edge face for manipulation by a wrench or a screw driver. The other end of each set screw abutting the corresponding bushing, and preferably the bushing has a circumferential groove 14a and the screw has a reduced end 15a to seat in said groove. Each shaft has a socket 13a in at least one end thereof for a wrench to rotate the shaft and eccentric bushing.

With this construction, the eccentric bushings can be rotated to provide infinite variations in the positioning of the bearing with respect to the mounting surfaces such as tracks, rails, or machine ways, and over-all height of the assembly between the upper edge face 11 and the point of contact of the rollers with a support track, rail or machine way A; and the set screws can be rotated to clamp the eccentric bushings in their adjusted positions. At the same time the reduced ends of the set screws in the grooves 14a hold the side wall blocks 10 and the bushings in properly assembled relation, even when the screws are loosened for rotation of the bushings.

The outer ends of each shaft 13 and the bushings desirably are flush with the outer face of the side wall in which the bushings are mounted. A lubricant feed bore 16 extends axially inward from one outer end of each shaft and communicates with radial feed passages 16a which, in turn, communicate with feed passages 16b extending radially through the body of the inner raceway 17 to supply lubricant to the antifriction rollers 18. The rollers 18 are maintained in central position between retainer rings 21 seated in complemental socket grooves in the outer side faces of the raceways and in contact with the inner faces of the side wall blocks as best shown in FIGURE 4.

It will be observed that the means, in the present instance the eccentric bushings, at the ends of the shafts provide for adjustment of the axes of the shafts relative to the top and bottom edge faces of the wall blocks, and the peripheral surface of the outer race ring of each antifriction bearing is disposed inwardly of the common plane of the top edge faces and said peripheral surface projects outwardly beyond the other edge faces of the wall blocks. The roller bearing assembly is capable of attachment as a unit to a linear motion body by bolts (not shown) seated in appropriate bolt holes 23 in the body of each side wall block.

I claim:

1. A roller block assembly comprising a pair of side wall blocks, each block having a flat edge face in a common plane with a corresponding edge face of the other wall block, each wall block also having another edge face opposite the first-mentioned edge face, a pair of parallel shafts extending transversely between said wall blocks, means at the ends of said shafts mounting the shafts for rotation in the wall blocks and providing for adjustment of the axes of the shafts relative to said edge faces of the wall blocks, said means comprising an eccentric bushing rigidly connected to each end of each shaft and rotatably mounted in the corresponding wall block whereby rotation of said eccentric bushing causes lateral movement of the shafts relative to said edge faces of the wall blocks, means for clamping said bushings against relative movement in said blocks including set screws threaded in said wall blocks, each set screw having one end extending through one of said edge faces of the corresponding wall block and its other end abutting the corresponding bushing, each bushing having a circumferential groove in its periphery and the corresponding screw having a reduced end portion disposed in said groove, thereby to hold the wall blocks and the bushings in properly assembled relation.

References Cited

UNITED STATES PATENTS

| | | | |
|---|---|---|---|
| 1,885,358 | 11/1932 | Koopmans | 308—226 |
| 2,107,234 | 2/1938 | Chambers | 308—6 |
| 2,554,299 | 5/1951 | Hammond | 308—6 |
| 3,190,703 | 6/1965 | Thomson. | |
| 3,220,096 | 11/1965 | Schraub | 308—6 |
| 3,246,933 | 4/1966 | Better. | |
| 3,382,013 | 5/1968 | Toth | 308—62 |

MARTIN P. SCHWADRON, Primary Examiner

L. L. JOHNSON, Assistant Examiner

U.S. Cl. X.R.

308—62